United States Patent
Potkonjak et al.

(10) Patent No.: US 8,417,754 B2
(45) Date of Patent: Apr. 9, 2013

(54) IDENTIFICATION OF INTEGRATED CIRCUITS

(75) Inventors: Miodrag Potkonjak, Los Angeles, CA (US); Farinaz Koushanfar, Houston, TX (US)

(73) Assignee: Empire Technology Development, LLC, Wilmington, DE (US)

(*) Notice: Subject to any disclaimer, the term of this patent is extended or adjusted under 35 U.S.C. 154(b) by 1001 days.

(21) Appl. No.: 12/463,984

(22) Filed: May 11, 2009

(65) Prior Publication Data

US 2010/0287604 A1 Nov. 11, 2010

(51) Int. Cl.
*G06F 7/38* (2006.01)
*G06F 7/10* (2006.01)

(52) U.S. Cl.
USPC ........... 708/446; 708/323; 708/160; 708/250; 708/270

(58) Field of Classification Search .................. None
See application file for complete search history.

(56) References Cited

U.S. PATENT DOCUMENTS

| | | | |
|---|---|---|---|
| 2004/0053429 A1 | 3/2004 | Muranaka | |
| 2004/0181303 A1 | 9/2004 | Walmsley | |
| 2006/0076663 A1 | 4/2006 | Marinet | |
| 2006/0253664 A1* | 11/2006 | Takaragi et al. | 711/154 |
| 2009/0228250 A1* | 9/2009 | Phillips | 703/2 |

OTHER PUBLICATIONS

International Search Report and Written Opinion, issued in International Application No. PCT/US2010/034110, mailed Sep. 9, 2010, 9 pages.

Chang, H. et al., "Statistical Timing Analysis Under Spatial Correlations," IEEE Transactions on Computer-Aided Design of Integrated Circuits and Systems, Sep. 2005, pp. 1467-1482, vol. 24, No. 9.

Gassend, B. et al., "Identification and Authentication of Integrated Circuits," Concurrency and Computation: Practice and Experience, Sep. 2004, pp. 1077-1098, vol. 16, No. 11.

Kahng, A. B. et al., "Watermarking Techniques for Intellectual Property Protection," Proceedings of the 35th annual Design Automation Conference, Jun. 1998, pp. 776-781.

Kirovski, D. et al., "Intellectual Property Protection by Watermarking Combinational Logic Synthesis Solutions," Proceedings of the 1998 IEEE/ACM international conference on Computer-aided design, Nov. 1998, pp. 194-198.

Kirovski, D. et al., "Local Watermarks: Methodology and Application to Behavioral Synthesis," IEEE Transactions on Computer-Aided Design of Integrated Circuits and Systems, Sep. 2003, pp. 1277-1284, vol. 22, No. 9.

(Continued)

*Primary Examiner* — Scott Sun
(74) *Attorney, Agent, or Firm* — Steven S. Rubin, Esq.; Moritt Hock & Hamroff LLP

(57) ABSTRACT

Techniques are generally described for generating an identification number for an integrated circuit (IC). In some examples, methods for generating an identification of an IC may comprise selecting circuit elements of the IC, evaluating measurements of an attribute of the IC for the selected circuit elements, wherein individual measurements are associated with corresponding input vectors previously applied to the IC, solving a plurality of equations formulated based at least in part on the measurements taken of the attribute of the IC for the selected circuit elements to determine scaling factors for the selected circuit elements, and transforming the determined scaling factors for the selected circuit elements to generate an identification number of the IC. Additional variants and embodiments may also be disclosed.

19 Claims, 10 Drawing Sheets

OTHER PUBLICATIONS

Koushanfar, F. et al., "Intellectual Property Metering," Proceedings of the 4th International Workshop on Information Hiding, Apr. 2001, pp. 81-95.

Lach, J. et al., "Fingerprinting Digital Circuits on Programmable Hardware," Proceedings of the Second International Workshop on Information Hiding, Apr. 1998, pp. 16-31.

Lach, J. et al., "Robust FPGA Intellectual Property Protection through Multiple Small Watermarks," Proceedings of the 36th annual ACM/IEEE Design Automation Conference, Jun. 1999, pp. 831-836.

Lee, J. et al., "A Technique to Build a Secret Key in Integrated Circuits for Identification and Authentication Applications," 2004 Symposium on VLSI Circuits, Jun. 2004, pp. 176-179.

Lofstrom, K. et al., "IC Identification Circuit Using Device Mismatch," Solid-State Circuits Conference 2000, Feb. 2000, pp. 1-10.

Narayanan, V. et al., "Reliability Concerns in Embedded System Designs," Computer, Jan. 2006, pp. 118-120, vol. 39, No. 1.

Qu, G. et al., "Analysis of Watermarking Techniques for Graph Coloring Problem," Proceedings of the 1998 IEEE/ACM international conference on Computer-aided design, Nov. 1998, pp. 190-193.

Su, Y. et al., "A Digital 1.6 pJ/bit Chip Identification Circuit Using Process Variations," IEEE Journal of Solid-State Circuits, Jan. 2008, vol. 43, No. 1.

Yuan, L. et al., "A Combined Gate Replacement and Input Vector Control Approach for Leakage Current Reduction," IEEE Transactions on Very Large Scale Integration (VLSI) Systems, Feb. 2006, vol. 14, No. 2.

Alkabani, Y. et al., "Trusted Integrated Circuits: A Nondestructive Hidden Characteristics Extraction Approach," Information Hiding, pp. 102-117, 2008.

International Preliminary Report on Patentability, issued in International Patent Application No. PCT/US2010/034110, mailed Nov. 24, 2011, 8 pages.

\* cited by examiner

| | NAND Gate | |
|---|---|---|
| | Input | Nominal leakage current (nA) |
| 10a → | 00 | 37.84 |
| 10b → | 01 | 100.3 |
| 10c → | 10 | 95.7 |
| 10d → | 11 | 454.5 |

| Gate | Scaling Factor | |
|---|---|---|
| | IC1 | IC2 |
| 50a → G1 | .5 | 2.4 |
| 50b → G2 | 1.3 | 0.6 |
| 50c → G3 | 2.1 | 4 |
| 50d → G4 | 3 | 0.9 |

| Input vector | Total Leakage (nA) | |
|---|---|---|
| | IC1 | IC2 |
| 70a → 00011 | 1391 | 2055 |
| 70b → 10101 | 2082 | 1063 |
| 70c → 01110 | 1243 | 2150 |
| 70d → 11001 | 1841 | 1905 |

(a) Constant margins (b) Equal areas

IDENTIFICATION OF INTEGRATED CIRCUITS

BACKGROUND

Integrated circuits (ICs) have been used widely in a plethora of electronic devices. In some applications, identification and authentication of an integrated circuit may be useful, for example, for security purposes. Conventional identification and authentication techniques may require additional circuitry, non-volatile storage and/or firmware to be included in an IC, which may not always be possible.

BRIEF DESCRIPTION OF THE DRAWINGS

Subject matter is particularly pointed out and distinctly claimed in the concluding portion of the specification. The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings. Various embodiments will be described referencing the accompanying drawings in which like references denote similar elements, and in which:

DETAILED DESCRIPTION OF ILLUSTRATIVE EMBODIMENTS

Figure 1:
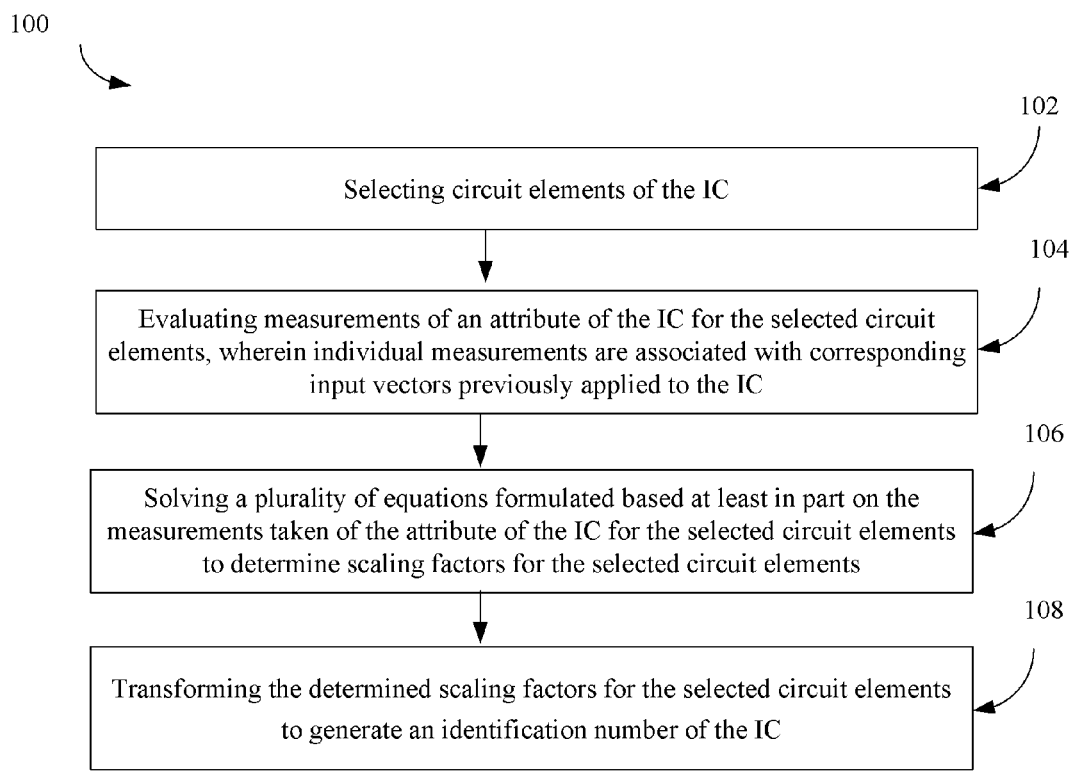
FIG. 1 illustrates a method for generating an identification number (ID) for an IC.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

In the following description, algorithms and/or symbolic representations of operations on data bits and/or binary digital signals stored within a computing system, such as within a computer and/or computing system memory may be presented. An algorithm may generally be considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as "storing", "processing", "retrieving", "calculating", "determining" etc. are used in this description they may refer to the actions/operations/functions of a computing platform, such as a computer or a similar electronic computing device such as a cellular telephone, that manipulates and/or transforms data represented as physical quantities including electronic and/or magnetic quantities within the computing platform's processors, memories, registers, etc.

This disclosure is drawn, inter alia, to methods, apparatus, systems and computer program products related to identification of ICs.

Generating an Identification Number of an IC

FIG. 1 illustrates a method 100 for generating an ID number of an IC including one or more circuit elements, in accordance with various embodiments of the present disclosure. For the illustrated embodiments, the method 100 may include blocks 102, 104, 106 and/or 108.

At block 102, method 100 may include selecting circuit elements of the IC. As an example, an IC may have a number of circuit elements, digital logic gates, flip-flops, transistors, resistors, capacitors, inductors, comparators, amplifiers, etc, one or more of which may be selected at block 102.

Processing may continue from block 102 to block 104. At block 104, method 100 may include evaluating measurements of an attribute of the IC for the selected circuit elements, wherein individual measurements are associated with corresponding input vectors previously applied to the IC. As an example, one or more input vector may be applied to one or more of the selected circuit elements, and corresponding measurements of an attribute may be taken and evaluated.

Processing may continue from block 104 to block 106. At block 106, method 100 may include solving a plurality of equations formulated based at least in part on the measurements taken of the attribute of the IC for the selected circuit elements to determine scaling factors for the selected circuit elements.

Processing may continue from block 106 to block 108. At block 108, method 100 may include transforming the determined scaling factors for the selected circuit elements to generate an identification number of the IC. Method 100 may be concluded after block 108.

Even though the manufacturing processes of integrated circuits have advanced tremendously in the last few decades, inherent variations may be present during such manufacturing process. Because of such manufacturing variations and/or variety of other reasons (e.g., type of manufacturing process utilized, etc.), two similar circuit elements (e.g., one or more types of digital logic gates, flip-flops, transistors, resistors, capacitors, inductors, comparators, amplifiers, etc.) in two different ICs may have variations in one or more attributes (e.g., leakage current, delay, switching power, operating temperature, parasitic capacitance, offset voltage, gain, etc.). For example, two NAND gates of substantially similar size and with similar inputs, and included in two different ICs may have different amount of leakage currents. Similarly, two similar circuit elements in the same IC may have variations in one or more attributes (e.g., capacitance, inductance, resistance, gain, offset voltage, threshold voltage, operating temperature, power consumption, idle current, leakage current, etc.).

Thus, in various embodiments, the manufacturing variability of one or more circuit elements of an IC may be used for identification and authentication of the IC, as will be discussed in further details herein later.

Figures 2A, 2B, 2C, 2D:
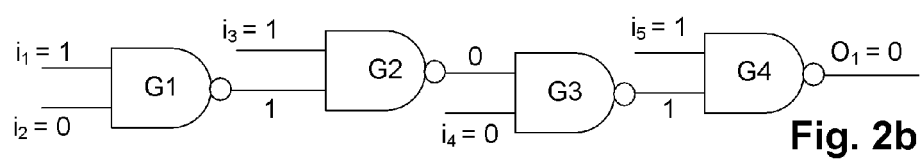
FIG. 2a illustrates an example table configured to store example nominal leakage current of an example circuit element, a nominal sized NAND gate, based at least in part on an input to the NAND gate.
FIG. 2b illustrates a part of an example IC that may be suitable for practicing various embodiments.
FIG. 2c illustrates an example table configured to store scaling factors of a plurality of NAND gates for two example ICs.
FIG. 2d illustrates an example table configured to store total leakage currents in one or more circuit elements of two example ICs for various input vectors.

FIG. 2a illustrates an example table configured to store example nominal leakage current of an example circuit element, a nominal sized two input NAND gate, based at least in part on the inputs to the NAND gate, in accordance with various embodiments. Individual rows $10a, \ldots, 10d$ of the table 10 illustrates different inputs to the NAND gate and corresponding nominal leakage current (measured in nano amperes or nA) of the NAND gate. For example, for an input of 01, the nominal leakage current may be around 100.3 nA, as illustrated in row $10b$ of table 10. As illustrated, the leakage current of the NAND gate may be based at least in part on the input to the gate.

In various embodiments, the leakage current of a circuit element (e.g., a NAND gate) may include a subthreshold leakage (e.g., $I_{sub}$) and/or a gate tunneling leakage ($I_{gate}$) for individual gates. Both currents (e.g., $I_{sub}$ and $I_{gate}$) may be modeled as exponential functions that may be approximated by a lognormal distribution. A full-chip leakage distribution may be a sum of the lognormal distributions of individual gates. The sum may not be theoretically known to have a closed form, but may be approximated as a lognormal distribution using method well known to those skilled in the art.

Referring again to FIG. 2a, the leakage currents illustrated in table 10 may be the nominal or usual leakage current values of a NAND gate. However, as previously discussed, because of variations during manufacturing, the leakage current may vary from one NAND gate to another. Accordingly, the nominal leakage current values illustrated in table 10 may be a typical, usual, nominal, expected, or average value of a nominal sized NAND gate. Generation of the table 10 may be accomplished by any reasonable method as will be understood in light of the present disclosure.

In various embodiments, the nominal leakage currents may be based at least in part on an operating environment (e.g., temperature, supply voltage, etc.) of the NAND gate, and the nominal leakage currents of table 10 may be for a specific operating environment. Although the table 10 may illustrate nominal leakage current of a typical NAND gate, similar tables may be generated for other attributes (delay, switching power, etc.) of a NAND gate. Furthermore, similar tables may be generated for one or more attributes of various other types of circuit elements (e.g., NOR gate, other logic gates, transistors, flip flops, etc.) as well.

FIG. 2b illustrates a part of an example IC 30 suitable for practicing various embodiments. The IC 30 may include several circuit elements, although only four example circuit elements (four NAND gates G1, . . . , G4) of the IC 30 is illustrated in FIG. 2b. Also illustrated are five primary inputs $(i_1, \ldots, i_5)$ to the circuit elements, example values of the individual primary inputs (e.g., $i_1=1, i_2=0, \ldots, i_5=1$), various intermediate signals and the output $O_1$.

In various embodiments, due to a variety of reasons (e.g., variations during the manufacturing process), one or more attributes (e.g., leakage current, delay, switching power etc.) of the individual NAND gates may be different. In various embodiments, leakage currents of individual gates G1, . . . , G4 may be different. For example, for an input 01, the nominal leakage current of a NAND gate may be around 100.3 nA (from table 10), although gate G2 may have a leakage current of around 130.39 nA for the same input. That is, the leakage current of gate G2 may be around 1.3 times (e.g., 130.39/100.3=1.3) the nominal leakage current of a typical NAND gate for input 01. On the other hand, gate G3 may have a leakage current of, for example, around 210.63 nA for input 01. That is, the leakage current of gate G3 may be around 2.1 times (e.g., 210.63/100.3=2.1) the nominal leakage current of a typical NAND gate for input 01. In various embodiments, a scaling factor of an attribute of a circuit element may be a ratio of an actual value of the attribute in the circuit element with a nominal value of the attribute. For example, in the above two examples, the scaling factor of the NAND gates G2 and G3 may be 1.3 and 2.1, respectively.

FIG. 2c illustrates an example table 50 configured to store scaling factors of a plurality of NAND gates for two example ICs, in accordance with various embodiments. The two ICs in table 50 may be identified as IC1 and IC2. In various embodiments, the two ICs (or a part of the two ICs) may be at least partially similar. In various embodiments, IC1 and/or IC2 may have a structure similar to that illustrated in FIG. 2b. For example, both IC1 and IC2 may include 4 NAND gates (G1, . . . , G4), similar to the IC 30 of FIG. 2b. Individual rows $50a, \ldots, 50d$ of the table 50 may represent the scaling factors for a NAND gate for IC1 and IC2. For example, as illustrated in row $50d$, the gate G4 of IC1 and IC2 may have scaling factors of around 3 and 0.9, respectively. As illustrated in row $10d$ of table 10, the nominal leakage current for input 11 of a typical NAND gate may be 454.5 nA. Accordingly, for input 11, the leakage current of gate G4 of IC1 may be, for example, around 1363.5 nA (e.g., 3*454.5 nA), and of gate G4 of IC2 may be, for example, around 409.05 nA (e.g., 0.9*454.5 nA). In another example, as illustrated in row 10c of table 10, the nominal leakage current for input 10 of a typical NAND gate may be around 95.7 nA. Accordingly, the leakage current of gate G2 of IC1 may be, for example, around 124.41 nA (e.g., 1.3*95.7 nA), and of gate G2 of IC2 may be, for example, around 382.8 nA (e.g., 4*95.7 nA).

Although not illustrated in FIG. 2c, in various embodiments, using tables 10 and 50, it may be possible to determine leakage currents of four NAND gates G1, . . . , G4 of both IC1 and IC2 for individual inputs (e.g., 00, 01, 10 and/or 11) to the NAND gates.

FIG. 2d illustrates an example table 70 configured to store total leakage currents in one or more circuit elements of two example ICs for various input vectors, in accordance with various embodiments. For example, individual rows 70a, . . . , 70d of table 70 illustrates the total leakage currents in the four NAND gates G1, . . . , G4 of IC1 and IC2 for different values of five primary inputs (e.g., $i_1, \ldots, i_5$).

For example, row 70b may illustrate the total leakage currents in the four NAND gates G1, . . . , G4 of IC1 and IC2 for input vector 10101 (e.g., when $i_1=1$, $i_2=0$, . . . , $i_5=1$). The status of various intermediate signals and the output is illustrated in FIG. 2b for this example input vector. For example, in this case, the input to gates G1, . . . , G4 may be 10, 11, 00, and 11, respectively. In various embodiments, consider IC2 with the example input vector of 10101. For this input vector, the input to gate G1 may be 10 (e.g., see FIG. 2b), and the corresponding leakage current of gate G1 may be around 95.7*2.4 nA (from rows 10c and 50a of tables 10 and 30, respectively) or about 229.68 nA. Similarly, the input to gate G2 may be 11, and the corresponding leakage current of gate G2 may around 454.5*0.6 nA or about 272.7 nA. The input to gate G3 may have a value of 00, and the corresponding leakage current of gate G3 may roughly correspond to 37.84*4 nA or about 151.36 nA. The input to gate G4 may be 11, and the corresponding leakage current of gate G4 may be around 454.5*0.9 nA or about 409.05 nA. Accordingly, the combined leakage current of four NAND gates of IC2 for input vector 10101 may be approximately (229.68+272.7+ 151.36+409.05)*1 nA≈1063 nA, as illustrated in row 70b of table 70. The other entries of table 70 similarly illustrate the total or combined leakage currents of the four NAND gates of IC1 and IC2 for various other example input vectors.

Although the tables in FIGS. 2a, 2c and 2d may be directed towards an example attribute (e.g., leakage current) of four example NAND gates arranged according to an example configuration, in various embodiments, similar tables may be generated for various other attributes (delay, switching power, or any other appropriate attributes) of various other types and configurations of circuit elements (e.g., other types of logic gates, transistors, etc.).

In various embodiments, the table 70 may be generated using information from, for example, tables 1a and 1b. In various embodiments, although the nominal leakage current (e.g., as in table 10) of NAND gates may be known in advance, the scaling factors of various NAND gates (e.g., as in table 50) in an IC may not always be known and such scaling factor may be different for different NAND gates in the same or different ICs.

However, in various embodiments, it may be possible to measure the total leakage current (e.g., leakage currents of table 70). From the measured total leakage current, it may be possible to determine the scaling factors of associated circuit elements. In various embodiments, using the determined scaling factors, it may be possible to identify and authenticate an IC, as will be described in more details herein later.

Determining Scaling Factors of Integrated Circuits

Figures 3A, 3B:
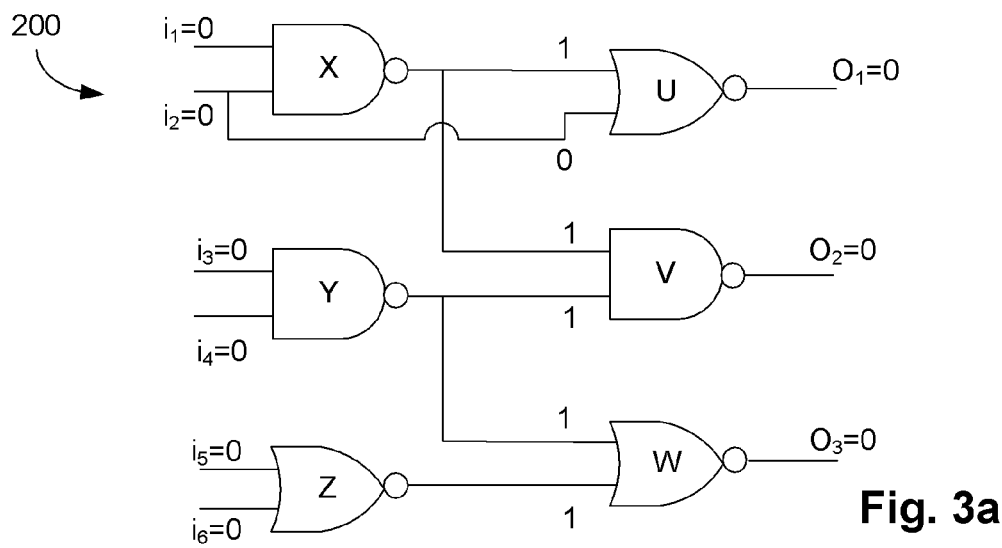
FIG. 3a illustrates a part of an example IC that may be suitable for practicing various embodiments.
FIG. 3b illustrates an example table configured to store example nominal leakage currents of NAND and NOR gates versus an input to the respective gates.

FIG. 3a illustrates a part of an example IC 200 suitable for practicing various embodiments in accordance with the present disclosure. The IC 200 may include several circuit elements, although only six example circuit elements (three NAND gates X, Y and V, and three NOR gates U, W and Z) of the IC 200 are illustrated in FIG. 3a. Also illustrated are six primary inputs ($i_1, \ldots, i_6$) to the circuit elements, example values of the individual primary inputs (e.g., $\{i_1, \ldots, i_6\}=000000$), various intermediate signals, and the outputs $O_1$, $O_2$, and $O_3$.

FIG. 3b illustrates an example table 240 configured to store example nominal leakage currents of NAND and NOR gates versus an input to the respective gates, in accordance with various embodiments of the present disclosure. For the purpose of this disclosure and unless otherwise stated, in various embodiments, $I_{ABC}(xx)$ may represent example nominal leakage current in circuit element ABC, where the arguments inside the parentheses may be an input to the circuit element. For example, $I_{NAND}(01)$ and $I_{NOR}(11)$ may represent example nominal leakage currents for a nominal sized 2-input NAND gate for input 01, and for a nominal sized 2-input NOR gate for input 11, respectively.

As previously discussed, in various embodiments, due to a variety of reasons (e.g., variations during the manufacturing process), one or more attributes (e.g., leakage current, delay, switching power etc.) of the individual circuit elements of IC 200 may be different from the respective nominal values. Accordingly, the leakage currents of one or more NAND and/or NOR gates of FIG. 3a may differ from the nominal leakage currents of table 240 by respective scaling factors, as earlier discussed herein. In various embodiments, the scaling factors of the six gates U, V, . . . , Z illustrated in FIG. 3a may be represented by $S_U, S_V, \ldots, S_Z$. In various embodiments, these scaling factors may be determined based on measurement of leakage currents of one or more gates U, V, . . . , Z.

The total leakage current of the circuit elements illustrated in FIG. 3a may be based at least in part on the inputs $i_1, \ldots, i_6$. These inputs may take one of various values (e.g., $\{i_1, \ldots, i_6\}=000000$, 000001, 010101, or the like). For the purpose of this disclosure, the primary inputs may form a corresponding input vector. Thus, an input vector of 010101 may refer to an input where $i_1=0$, $i_2=1$, $i_3=0$, $i_4=1$, $i_5=0$, and $i_6=1$. In various embodiments, one or more of a plurality of input vectors (e.g., 000000, 010101, 111111, 101010, or the like) may be applied to the circuit elements of IC 200.

In various embodiments, $I_{leak}(.)$ may represent measured leakage current for the six circuit elements illustrated in FIG. 3a, wherein the arguments inside the parentheses may be an input vector for which the leakage current may be measured. For example, the leakage current $I_{leak}(000000)$ may be the measured leakage current in the six gates of FIG. 3a for an input vector of 000000. In various embodiments, the measured leakage current may have an error (denoted by $e_1$) due to, for example, limitations or errors in the measurement.

In various embodiments, the measured leakage current $I_{leak}(000000)$ may be expressed in terms of the leakage current of individual gates and the error term $e_1$. For example, for input vector 000000, the input to gate X may be 00, and the corresponding leakage current of gate X may be $S_X \cdot I_{NAND}(00)$, where $S_X$ may be unknown and the value of $I_{NAND}(00)$ (e.g., 37.84 nA) may be derived from row 240a of table 240.

In another example, for input vector 000000, the input to gate U may be 10, and the corresponding leakage current of gate U may be $S_U \cdot I_{NOR}(10)$, wherein $S_U$ may be unknown and the value of $I_{NOR}(10)$ (e.g., 213 nA) may be derived from row 240c of table 240. Accordingly, the leakage current $I_{leak}$ (000000) for IC 200 may be expressed as:

$$I_{leak}(000000)+e_1=S_X \cdot I_{NAND}(00)+S_Y \cdot I_{NAND}(00)+S_Z \cdot I_{NOR}(00)+S_U \cdot I_{NOR}(01)+S_V \cdot I_{NAND}(11)+S_W \cdot I_{NOR}(11)$$ Equation 1

In various embodiments, similar equations may be formed for various other input vectors. For example:

$$I_{leak}(010101)+e_2=S_X \cdot I_{NAND}(01)+S_Y \cdot I_{NAND}(01)+S_Z \cdot I_{NOR}(01)+S_U \cdot I_{NOR}(11)+S_V \cdot I_{NAND}(11)+S_W \cdot I_{NOR}(10)$$ Equation 2.

In various embodiments, M different equations (e.g., equations 1, ..., M) may be formed for corresponding M different input vectors. For example, equation M may be:

$$I_{leak}(111000)+e_i=S_X \cdot I_{NAND}(11)+S_Y \cdot I_{NAND}(10)+S_Z \cdot I_{NOR}(00)+S_U \cdot I_{NOR}(01)+S_V \cdot I_{NAND}(11)+S_W \cdot I_{NOR}(11),$$ Equation M, wherein equation M is for an example input vector 111000.

The individual M linear equations may represent, for a given input vector, a linear relationship between a total measured leakage current for the six gates U, ..., Z and the scaling factors $S_U, ..., S_Z$ of the individual gates, wherein the scaling factors may not be known in advance. In various embodiments, an optimization problem may be formulated to determine the scaling factors $S_U, ..., S_Z$. For example, equations 1, ..., M may form the constraints of the optimization problem. An objective function (OF) may be to optimize a specific norm of the measurement error. For example, function $f(E)$ may denote a function for measuring a metric of errors, where $E=\{e_i\}_{i=1}^M$, and the OF may be to minimize $f(E)$ (e.g., OF: min $f(E)$), subject to M constraints (e.g., the M equations). The term "minimize" and/or the like as used herein may include a global minimum, a local minimum, an approximate global minimum, and/or an approximate local minimum. Likewise, it should also be understood that the term "maximize" and/or the like as used herein may include a global maximum, a local maximum, an approximate global maximum, and/or an approximate local maximum.

In various embodiments, the function $f(.)$ may take one of various forms. For example, any appropriate $L_p$ norm of the error function may be used for the function $f(.)$, where the $L_p$ norm may be defined as:

$$L_p = \left(\sum_{m=1}^M w_m |e_m|^p\right)^{1/p} \text{ for } 1 \leq p \leq \infty,$$ Equation (M + 1), and $L_p = \max_{m=1}^M w_m |e_m|$ if $p = \infty$, where $w_m$ may be appropriate weighing factor.

In various embodiments, the optimization problem may take many different formats based at least in part on a form of the OF and/or the function $f(E)$. In various embodiments, the $L_p$ error norms may include non-linear terms in the OF, which may be solved using available nonlinear optimization methods. In various embodiments, the non-linear problem may be formulated or transformed into linear, quadratic, or convex optimization problems, and may be solved accordingly.

For example, an $L_1$ norm may be used to formulate the function $f(E)$. In that case, the OF may be written in the form of a linear program as:

$$\min \sum_{m=1}^M |e_m|$$

The linear program may be subject to the M constraints of equations 1, ..., M. In this case, the absolute function $|e_m|$, although nonlinear, may be converted to a linear form by introducing M auxiliary variables $e_m^+$, m=1, ..., M, and adding 2M constraints (e.g., for individual m, $e_m^+ \geq e_m$, and $e_m^+ \geq -e_m$). In various embodiments, the optimization problem may be solved using one of various available linear programming techniques known to those skilled in the art, to determine one or more scaling factors $S_U, ..., S_Z$.

In another example, an $L_2$ norm may be used to formulate the function $f(E)$. In that case, the OF may be given as:

$$\min \sqrt{\sum_{m=1}^M e_m^2}$$

which may be equivalent to:

$$\min \sum_{m=1}^M e_m^2$$

The OF may be in quadratic form, and the optimization problem may be solved using one of various available non-linear and/or quadratic programming techniques known to those skilled in the art, to determine one or more scaling factors $S_U, ..., S_Z$.

In another example, an $L_\infty$ norm may be used to formulate the function $f(E)$. In that case, a new variable $e_{max}$ may be formulated which may satisfy the constraints $e_{max} \geq e_m$ for m=1, ..., M. The OF may be simplified as OF=min ($e_{max}$), and the optimization problem may be solved using one of various available linear programming techniques known to those skilled in the art, to determine one or more scaling factors $S_U, ..., S_Z$.

In various embodiments, one or more error terms $e_i$, i=1, ..., M, may be assumed to follow independent and identically distributed (i.i.d.) Gaussian distribution N (0. $\sigma^2$). In that case, a log-likelihood function may be expressed as:

$$\max \sum_{m=1}^M \log\left(\exp^{-\frac{e_m^2}{2\sigma^2}}\right) \equiv \max \sum_{m=1}^M -e_m^2 \equiv \min \sum_{m=1}^M e_m^2$$

The expression may be equivalent to the previously discussed quadratic form of the OF and the optimization problem may be solved using one of various available non-linear and/or quadratic programming techniques known to those skilled in the art, to determine one or more scaling factors $S_U, ..., S_Z$.

Thus, as discussed, the scaling factors $S_U, ..., S_Z$ may be determined by measuring the total leakage currents $I_{leak}(.)$ for various input vectors, and formulating and solving an associated optimization problem. In various embodiments, instead of and/or in addition to determining scaling factors for leakage currents of individual gates, scaling factors of one or more other attributes may be determined in a similar manner. For example, scaling factors for switching delay of individual gates and/or scaling factors for switching power requirement of individual gates may be determined. In various embodiments, scaling factors of more than one attributes of one or more circuit elements may be determined and subsequently used for generation of identification (ID) of an IC.

In various embodiments, a unique solution to one or more scaling factors of corresponding one or more circuit elements of an IC may not always exists. There may exists one or more ambiguous circuit elements for which determination of corresponding scaling factors may not always be possible. Ambiguous circuit elements may refer to those circuit elements whose combination may achieve the same ratio of scaling factors, and/or whose scaling factors may be indistinguishable (and hence, may not be uniquely determined). For example, three inverters Inv A, Inv B, and Inv C (e.g., with scaling factors $S_A$, $S_B$, and $S_C$) may be arranged in series connection such that an output of Inv A is coupled to an input of Inv B, and an output of Inv B is coupled to an input of Inv B. For such an arrangement, the term $(S_A I_{inv}(0)+S_B I_{inv}(1)+S_C I_{inv}(0))$ and/or the term $(S_A I_{inv}(1)+S_B I_{inv}(0)+S_C I_{inv}(1))$ may be present in the corresponding set of leakage current equations, where $I_{inv}(.)$ may represent the nominal leakage current of an invertor for a corresponding input. In various embodiments, from one (or both) of these two terms, it may not be possible to distinguish between scaling factors $S_A$, $S_B$ and/or $S_C$ by solving the associated optimization problem, because of, for example, lack of sufficient degrees of freedom.

There may be many other examples of ambiguous circuit elements in an IC (e.g., because of reconvergent fanout). In various embodiments, ambiguous circuit elements may be taken into account while formulating and/or solving the optimization problem associated with determination of the scaling factors. For example, the leakage current equations may be solved to identify one or more ambiguous circuit elements. In various embodiments, one or more ambiguous circuit elements may be consolidated into one entity and/or the characteristics (e.g., scaling factors) of one or more ambiguous circuit elements may not be used in generating an ID of an IC.

Figure 4:
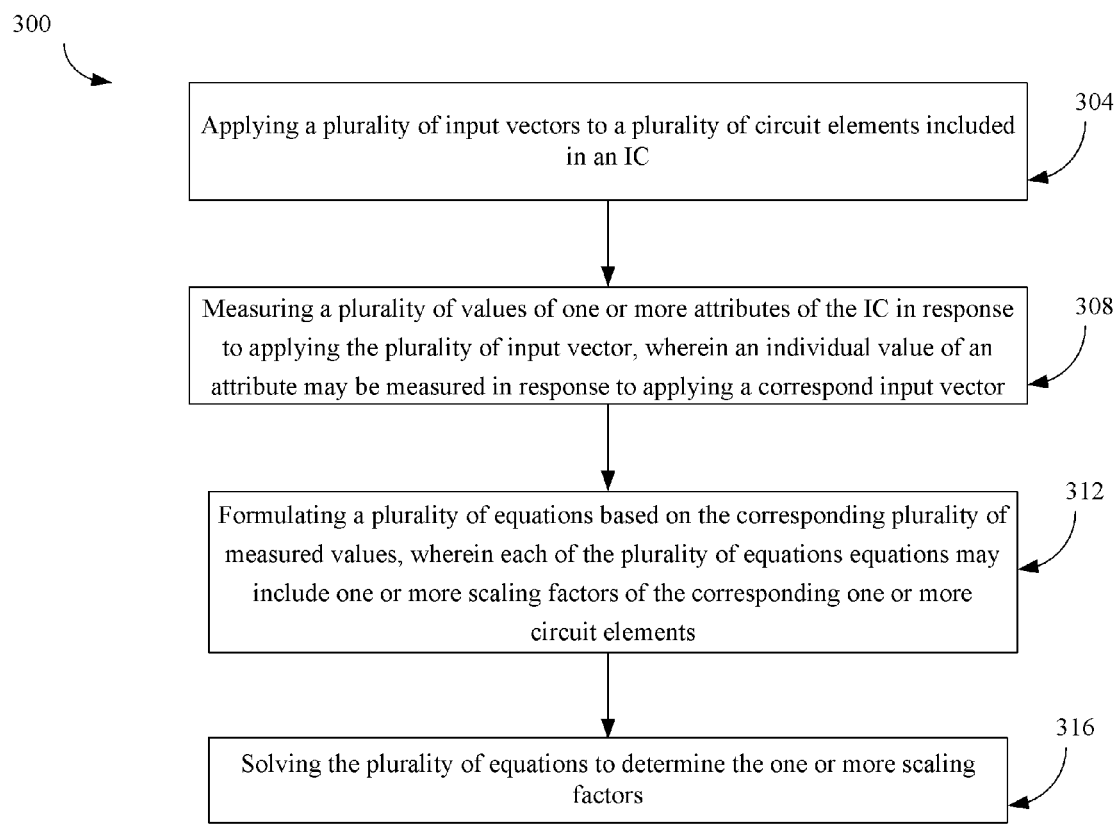
FIG. 4 illustrates a method for determining a plurality of scaling factors of a corresponding plurality of circuit elements of an IC.

FIG. 4 illustrates an example method 300 for determining a plurality of scaling factors of a corresponding plurality of circuit elements of an IC, in accordance with various embodiments of the present disclosure. In various embodiments, the method 300 may include one or more of blocks 304, 308, 312 and/or 316.

At block 304, method 300 may include applying a plurality of input vectors to a plurality of circuit elements included in an IC. For example, a plurality of input vectors may be applied to gates U, ..., Z of IC 200 of FIG. 3a. Processing may continue from block 304 to block 308.

At block 308, method 300 may include measuring a plurality of values of one or more attributes of the IC in response to applying the plurality of input vectors, wherein an individual value of an attribute may be measured in response to applying a correspond input vector. The attributes may be, for example, leakage currents, switching power, delay, and/or any other appropriate attributes. For example, as previously discussed, the attribute may be total leakage current $I_{leak}(.)$ for the six circuit elements illustrated in FIG. 3a. For an individual input vector, a corresponding value of the leakage current $I_{leak}(.)$ may be measured. Processing may continue from block 308 to block 312.

At block 312, method 300 may be include formulating a plurality of equations based on the corresponding plurality of measured values, wherein each of the plurality of equations may include one or more scaling factors of the corresponding one or more circuit elements. For example, based on the measured values of the total leakage current $I_{leak}(.)$, equations 1, ..., M may be formulated. Individual equations may correspond to a measured value of the total leakage current $I_{leak}(.)$, corresponding to respective applied input vector. For example, equation 1 may be formulated based on the total leakage current $I_{leak}(000000)$, that may be measured in response to applying the input vector 000000, as previously discussed. In various embodiments, PI (e.g., equal to six for the IC 200) may be a number of primary inputs (i1, ..., i6) to the circuit elements under consideration, and G (e.g., six) may the number of circuit elements (e.g., gates U, ..., Z) under consideration. In that case, the number of equations generated may be equal to $\min\{2^{PI}, 3G\}$. Processing may continue from block 312 to block 316.

At block 316, method 300 may include solving the plurality of equations to determine the one or more scaling factors. For example, equations 1, ..., M may be solved using one of several optimizations techniques discussed earlier. Method 300 may be concluded after block 316.

In various embodiments, the IC may be operated such that error in measuring the values of one or more attributes may be relatively lower and/or measuring the values of one or more attributes may be conducted with relatively lower precision requirement. That is, one or more operating conditions (e.g., temperature of one or more circuit elements, operating voltage, etc.) of the IC may be varied to reduce the precision required for measuring the values of one or more attributes. For example, while measuring values corresponding to leakage current, delay or switching power (e.g., while using leakage current and/or switching power as attribute(s)), temperature of the IC may be intentionally increased (e.g., using self heating), which may increase the leakage current, switching delay and/or switching power of individual circuit elements of the IC, thereby decreasing sensitivity towards measurement errors. In various embodiments where switching delay may be used as an attribute, the supply voltage to the IC may be reduced, which may result in an increase the switching delay of individual circuit elements, thereby decreasing sensitivity towards measurement errors. As changes in these operating conditions (e.g., change in temperature of individual circuit elements and operating voltage) may proportionally affect individual circuit elements for which the scaling factors may be determined, the scaling factors may not be affected by these changes. For example, an increase in the temperature of the six gates of FIG. 3a may affect the leakage current of the six gates substantially proportionally (e.g., increase the leakage current of individual gates by, for example, 5%). This increase in leakage current may be cancelled from both sides of the individual equations 1, ..., M, thereby not affecting the scaling factors of the individual gates.

Transforming Scaling Factors in IC Identification

In various embodiments, after determining scaling factors of one or more circuit elements of an IC, the determined scaling factors may be used to generate an ID of the IC. The scaling factors may be transformed into an ID of the IC in a variety of ways.

In a simple example scenario, scaling factors equal to or greater than 1 may be denoted by a 1 in an ID number of the IC, while scaling factors less than 1 may be denoted by 0 in the ID number of the IC. For example, as illustrated in table 50 of FIG. 2c, the scaling factors of gates G1, ..., G4 of IC1 may be equal to 0.5, 1.3, 2.1 and 3, respectively. Accordingly, an example ID number of IC1 may correspond to 0111, each of the digits in the ID number being mapped to a respective one of the scaling factors for gates G1 ... G4. Similarly, an ID number of IC2 of table 50 may correspond to 1010, based on the scaling factors 2.4, 0.6, 4.0 and 0.9.

The scaling factors may be transformed or mapped into an ID of the IC in a variety of other ways. Generation of the ID may be based on several factors. For example, the order in which the scaling factors of various circuit elements may be considered may affect the generation of such ID. In various embodiments, a length of an indicator string of an IC may refer to a number of circuit elements (e.g., number of gates) in a netlist of the design of the IC that may be used to generate the IC ID. The netlist may describe a connectivity of various circuit elements in an electronic design. In various embodiments, the order of the circuit elements in the netlist may correspond to an x and y placement coordinates of the individual circuit elements. For example, a circuit element with a lower x coordinate may have a lower position as compared to a circuit element with a relatively higher x coordinate. If two circuit elements have equal x coordinates, the circuit element with lower y coordinate may have a lower position as compared to the circuit element with a relatively higher y coordinate. Accordingly, one or more circuit elements may be ordered based on respective coordinates, and this ordering of the circuit elements may be used during generation of the ID for the associated IC.

In various embodiments, scaling factors of every circuit elements in an IC may not be determined due, for example, to the presence of ambiguous circuit elements, complexity in formulating and/or solving the associated optimization problem, lack of measurement of leakage currents of one or more circuit elements, etc. In various embodiments, characteristics of every circuit elements in an IC may not be required to formulate an ID of the IC. If a circuit element may be used for identification, a corresponding bit in the indicator string may be set to 1. Similarly, if a circuit element may not be used for identification, a corresponding bit in the indicator string may be set to 0. In various embodiments, the indicator string may represent the circuit elements whose scaling factors may be used for generating an ID of the IC.

In various embodiments, while transforming analog scaling factors into an ID of an IC, a variety of factors may be taken into account. For example, a distribution of the analog scaling factors may be taken into account to select one or more scaling factors to be used for generating the ID and/or for converting the analog scaling factor to a digital identification. In various embodiments, after extracting the scaling factors of a plurality of circuit elements of an IC, a histogram or a probability density function (PDF) of the extracted scaling factors may be created.

Figure 5:
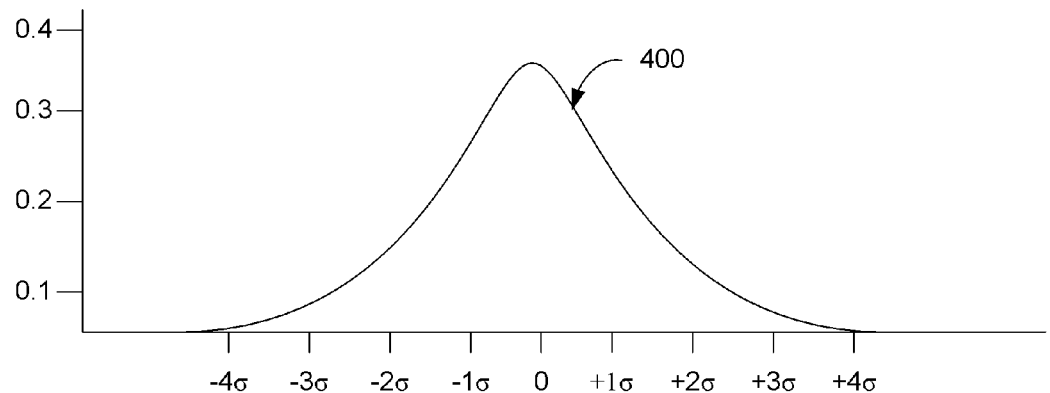
FIG. 5 illustrates a probability distribution function (PDF) of example scaling factors of an IC.

FIG. 5 illustrates a PDF 400 of example scaling factors of an IC, in accordance with various embodiments of the present disclosure. In various embodiments, the example PDF 400 may have a bell shaped curve with an example standard deviation of σ, although other shapes of the PDF may be possible. In various embodiments, the PDF 400 may be a histogram of the extracted scaling factors, obtained after appropriate smoothing of the histogram curve.

One of a variety of binary coding techniques may be used to transform one or more scaling factors into binary form using, for example, a PDF or a histogram of the extracted scaling factors. For example, a binary coding technique may utilize a concept of constant margin coding and/or equi-area coding, as will be discussed below.

Constant Margin Coding

Figure 6A:
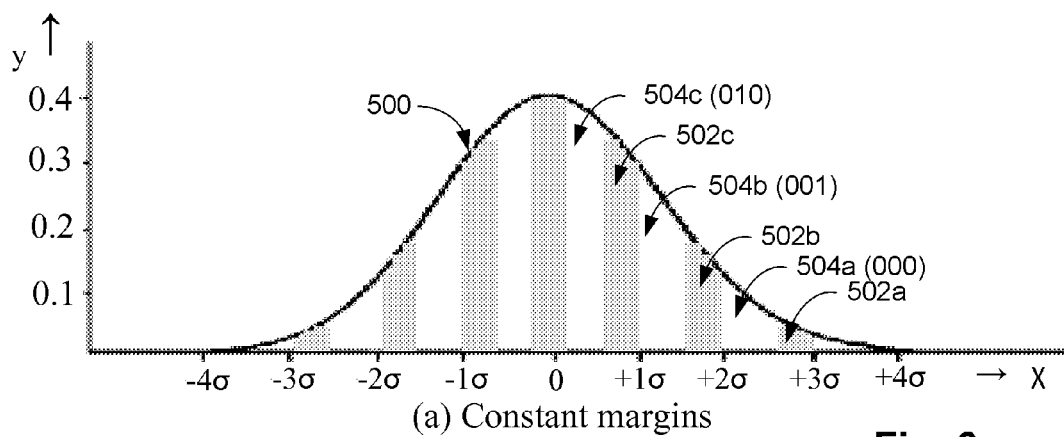
FIG. 6a illustrates a constant margin coding technique for coding a plurality of scaling factors in binary form.

FIG. 6a illustrates a constant margin coding technique for coding a plurality of scaling factors in binary form, in accordance with various embodiments of the present disclosure.

FIG. 6a includes a PDF 500 of scaling factors. The constant margin coding may find a robust binary conversion of the analog scaling factor codes by partitioning the PDF 500 into a plurality of regions or segments. In FIG. 6a, the regions may be marked as either white (e.g., regions 504a, 504b, 504c, etc.) or gray (e.g., regions 502a, 502b, 502c, etc.). The white and dark regions may be interleaved.

In various embodiments, one or more white regions may have similar widths, and one or more grey regions may have similar widths. In some embodiments, individual white regions may have similar widths, individual grey regions may have similar widths, and an average width of the white regions may be relatively more than that of the grey regions. In some additional embodiments, individual white regions and individual grey regions may have similar widths. The number and/or width of the white and/or grey regions in PDF 500 are merely examples, and PDFs with a different number of regions and/or different widths of white and/or grey regions are contemplated and within the scope of this disclosure.

In various embodiments, regions with similar color coding may either be approved or banned during forming the ID of the IC. For example, the white regions 504a, 504b, 504c, etc. may be approved and the grey regions 502a, 502b, 502c, etc. may be banned. Thus, if the value of a scaling factor of a circuit element falls into the banned region (e.g., region 502b), the scaling factor may not be considered in the ID formation and a corresponding bit in the indicator string may be set to 0. Similarly, if the value of a scaling factor of a circuit element falls into the approved region (e.g., region 504a), the scaling factor may be considered in the ID formation and a corresponding bit in the indicator string may be set to 1.

In various embodiments, individual approved regions may be given a binary code. For example, white regions 504a, 504b and 504c may be given codes 000, 001, and 010, respectively. A scaling factor falling in a specific white region (e.g., region 504b) may obtain a binary code of the respective region (e.g., 001). The binary codes of individual scaling factors falling in the approved region may be determined, which may form an ID of the IC.

In some embodiments, the length of the binary codes may be based at least in part on the number of partitions. A relatively large number of partitions (e.g., with smaller region width) may increase the length of the IC ID, but may decrease a robustness of the binary codes. Thus, the number of partitions may provide a trade of between the length of the IDs and robustness of the binary codes.

Figure 6B:
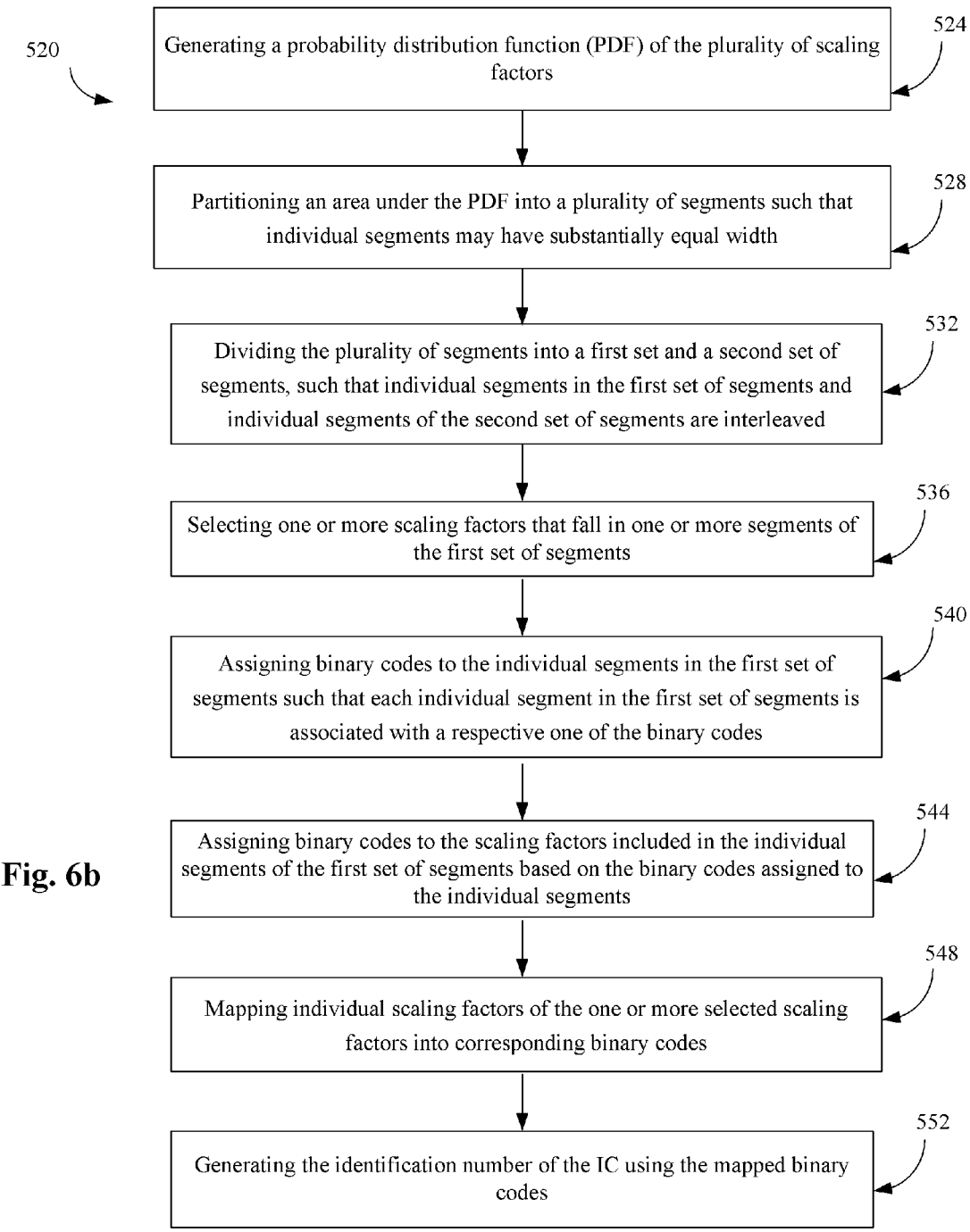
FIG. 6b illustrates a method for generating an identification (ID) of an IC based at least in part on a determined plurality of scaling factors of a corresponding plurality of circuit elements of the IC.

FIG. 6b illustrates a method 520 for generating an ID of an IC based at least in part on a determined plurality of scaling factors of a corresponding plurality of circuit elements of the IC, in accordance with various embodiments of the present disclosure. In various embodiments, the plurality of scaling factors may be determined using, for example, method 300 of FIG. 4.

Referring to FIGS. 6a and 6b, in various embodiments, method 520 may include one or more of blocks 524, 528, 532, 536, 540, 544, 548 and/or 552.

At block 524, method 520 may include generating a PDF (e.g., PDF 500 of FIG. 6a) of the plurality of scaling factors.

Processing may continue from block 524 to block 528, which may include partitioning an area under the PDF into a plurality of segments such that individual segments have substantially equal width. For example, as illustrated in FIG. 6a, the area under the PDF 500 may be divided into a plurality of segments 520a, . . . , 502c, 504a, . . . , 504c, etc. such that individual segments may have substantially equal width. Processing may continue from block 528 to block 532.

At block 532, method 520 may include dividing the plurality of segments into a first set (e.g., the white segments 504a, ..., 504c) and a second set (e.g., the grey segments 502a, ..., 502c) of segments, such that individual segments of the first set of segments and individual segments of the second set of segments are interleaved (e.g., individual white and grey segments are interleaved). Processing may continue from block 532 to block 536.

At block 536, method 520 may include selecting one or more scaling factors that fall in one or more segments of the first set of segments. For example, one or more scaling factors that fall in one or more segments of the white segments may be selected for generating ID of the IC. In various embodiments, in an indicator string, a bit corresponding to a selected scaling factors may be set to one, as previously discussed. Processing may continue from block 536 to block 540.

At block 540, method 520 may include assigning binary codes to the individual segments in the first set of segments such that each individual segment in the first set of segments is associated with a respective one of the binary codes. For example, white segments 504a, 504b and 504c may be assigned binary code 000, 001 and 101, respectively. Processing may continue from block 540 to block 544.

At block 544, method 520 may include assigning binary codes to the scaling factors included in the individual segments of the first set of segments based on the binary codes assigned to the individual segments. For example, individual scaling factors included in the segment 504b may be assigned binary code 001. Processing may continue from block 544 to block 548.

At block 548, method 520 may include mapping individual scaling factors of the one or more selected scaling factors into corresponding binary codes. For example, the assignment of binary codes to individual selected scaling factors at block 544 may be a part of the mapping at block 548. Processing may continue from block 548 to block 552.

At block 552, method 520 may include generating the ID number of the IC using the mapped binary codes. Method 520 may be concluded after block 552.

Equi-Area Coding

Figure 7A:
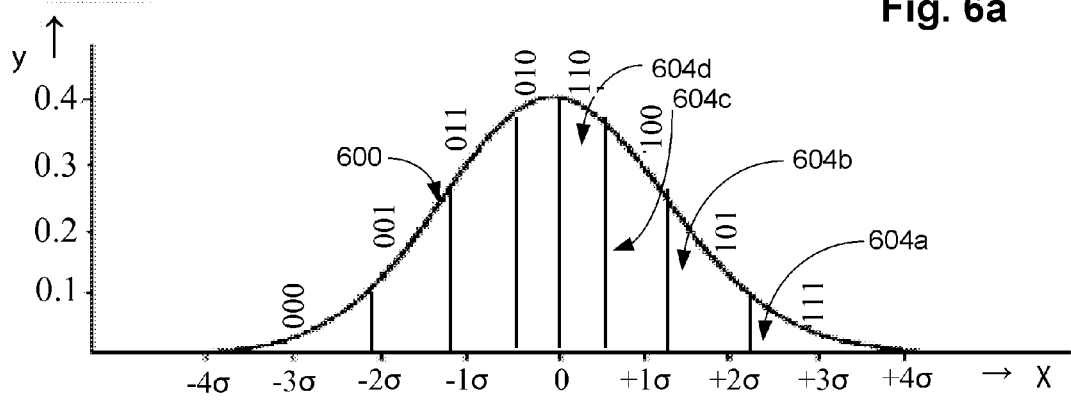
FIG. 7a illustrates an equi-area coding technique for coding a plurality of scaling factors in binary form.

FIG. 7a illustrates an equi-area coding technique for coding a plurality of scaling factors in binary form, in accordance with various embodiments. FIG. 7a includes a PDF 600 of the scaling factors. The equi-area coding may find a robust binary conversion of the analog scaling factor codes by partitioning area under the PDF curve 600 into a plurality of segments or regions (e.g., regions 604a, 604b, 604c, 604d, etc.). In various embodiments, the regions may be portioned in such a way that area under the PDF curve of individual regions may be substantially equal. Thus, the probability of a scaling factor belonging to any one of the regions may be substantially similar. In the example portioning of FIG. 7a, the PDF 600 may be portioned in 8 regions, although a different number of regions may be possible. In various embodiments, individual regions may be assigned a binary bit code. For example, for an 8 region partition, a 3-bit code may be used to identify individual regions, as illustrated in FIG. 7a (e.g., region 604b may be assigned 101).

In some embodiments, one or more (or all) regions in FIG. 7a may be used for generation of ID of an IC. Scaling factor falling in a specific region (e.g., region 604b) may obtain a binary code of the respective region (e.g., 101). The binary codes of individual scaling factors may be determined, which may form an ID of the IC.

In some additional embodiments, because of a variety of factors (e.g., measurement errors, error in determining the scaling factors, etc.), a scaling factor that is supposed to be in a region (e.g., region 604b, with code 101) may actually fall in an adjacent region (e.g., region 604a or 604c). In some embodiments, a robustness of the ID may be achieved by taking into account the order of segments during verification or authentication of the ID of the IC. For example, changing the value of a scaling factor by a relatively small amount may translate into shifting the scaling factor to a previous or a next region of FIG. 7a. The encoding scheme may take into account such changes. For example, the scaling factor of a gate may fall in region 604b and may be encoded as 101. For ID verification, the scaling factor of the same gate may be considered to be equal to any gate that may have codes 100, 101, or 111. Accordingly, the assigned ID may be robust against small variations in a scaling factor, as long as the scaling factor stays in the intended region (e.g., region 604b) or in an adjacent region (e.g., regions 604a or 604c).

Figure 7B:
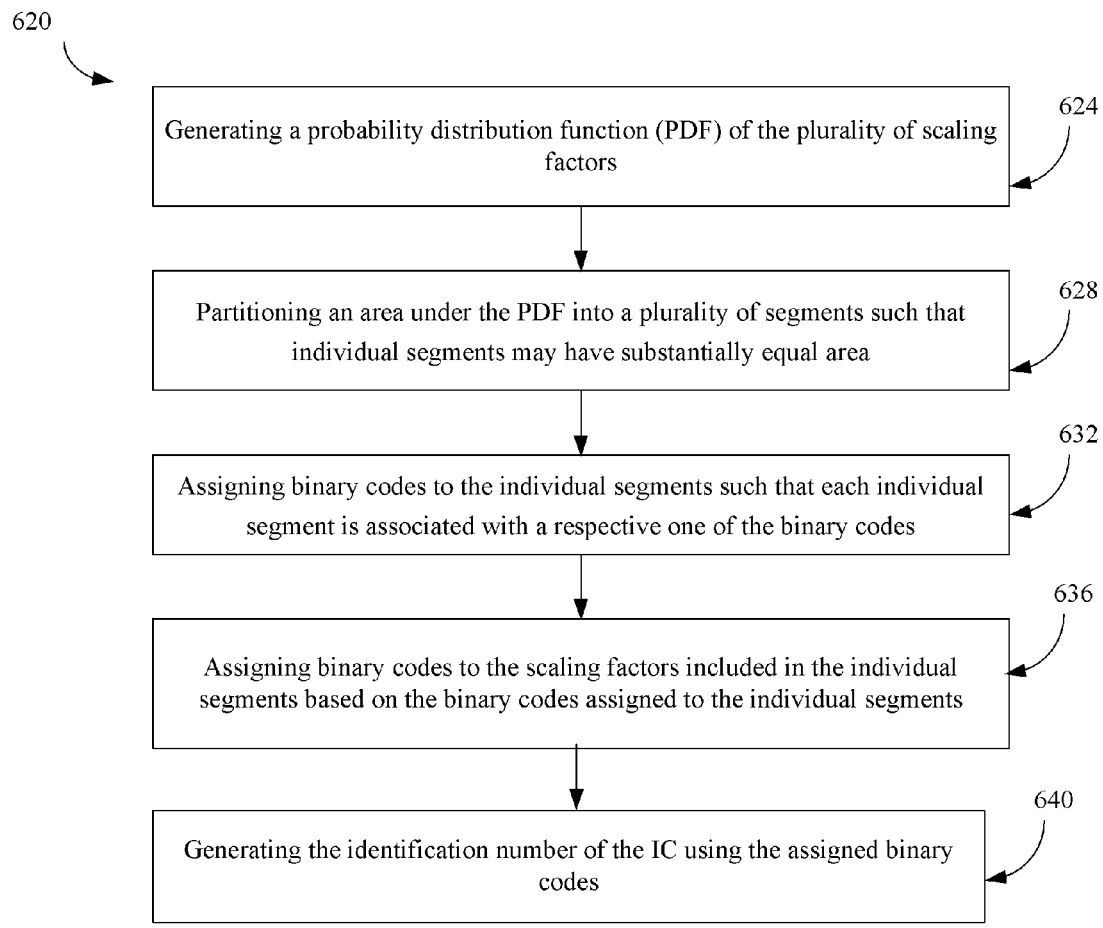
FIG. 7b illustrates a method for generating an ID of an IC based at least in part on a determined plurality of scaling factors of a corresponding plurality of circuit elements of the IC.

FIG. 7b illustrates a method 620 for generating an ID of an IC based at least in part on a determined plurality of scaling factors of a corresponding plurality of circuit elements of the IC, in accordance with various embodiments of the present disclosure. In various embodiments, the plurality of scaling factors may be determined using, for example, method 300 of FIG. 4. Referring to FIGS. 7a and 7b, in various embodiments, method 620 may include one or more of blocks 624, 628, 632, 636 and/or 640.

At block 624, method 620 may include generating a PDF (e.g., PDF 600 of FIG. 7a) of the plurality of scaling factors. Processing may continue from block 624 to block 628.

At block 628, method 620 may include partitioning an area under the PDF into a plurality of segments (e.g., segments 604a, ..., 604d, etc.) such that individual segments may have substantially equal area. Processing may continue from block 628 to block 632.

At block 632, method 620 may include assigning binary codes to the individual segments such that each individual segment is associated with a respective one of the binary codes (e.g., assigning binary code 101 to segment 604b). Processing may continue from block 632 to block 636.

At block 636, method 620 may include assigning binary codes to the scaling factors included in the individual segments based on the binary codes assigned to the individual segments. For example, individual scaling factors included in the segment 604b may be assigned binary code 101. In various embodiments, the assignment of the binary codes to individual scaling factors may map the scaling factors into corresponding binary codes. Processing may continue from block 636 to block 640.

At block 640, method 620 may include generating the ID number of the IC using the assigned binary codes. Method 620 may be concluded after block 640.

Probabilistic Analysis of Collision of IDs

Once the ID may be generated, a robustness (e.g., the probability of the generated ID being unique) of the generated ID may be analyzed. In various embodiments, the generated ID may include a collection of K binary sequences, with individual sequences of length M. For example, K scaling factors may be used to generate binary codes, wherein individual binary codes may be of length M (e.g., 3). The probability of more than one IC having the same ID may be equated to the probability of collision among the K strings. In various embodiments, there may be a total of $n=2^M$ binary length M sequences. The variable $P_i$ may denote a probability that the ID of the IC may be in sequence i, and let P=(P1, . . . , Pn) be the collection of probabilities of all n sequences.

The probability of no match between K sequences may be given by:

$$P(M, K, n^{-1}) = \frac{2^M!}{K^{2^M}(2^M - K)!}$$

The probability of collision may be given by:

$$P(\text{collision}) = 1 - \frac{2^M!}{K^{2^M}(2^M - K)!}$$

When the sequences may not be equally likely, probability of collision may be given by:

$$P(\text{collision}) = 1 - P(M, K, P) \qquad \text{Equation (M + 2)}$$
$$= 1 - K! \sum_{1 \leq v1 \leq K \leq vk \leq n} P_{v1} P_{v2K} P_{vK},$$

where P(M, K, P) may be the complimentary probability that no collision occurs. This equation may represent the collision probability of the IDs. This probability may be based at least in part on the formulation of the ID generation problem.

For example, in a first case, the bit in the sequence of the generated ID may be independent and identically distributed (i.i.d.) with P(any bit is 1)=π, and P(any bit is 0)=1−π. In that case, the probability Pi may be given by $P_i = (1-\pi)^{n_0 i} \pi^{n_1 i}$, where $n_0 i$ may denote the total number of zeros in sequence i and $n_1 i$ may denote the total number of its ones in the sequence i.

In a second case, the bits in individual sequences may be independent but not identically distributed with:

$P(\text{bit } m \text{ is } 1) = \pi_m$ $P(\text{bit } m \text{ is } 0) = 1 - \pi_m$ The function $I(b_m)$ may be defined as:

$$I(b_m) = \begin{cases} \pi_m, & b_m = 1 \\ 1 - \pi_m, & b_m = 0. \end{cases}$$

The probability $P_i$ may be represented as:

$P_i = \Pi_{m=1}^{M} I(b_m).$

In a third case, the bits in individual sequences may be correlated and their cumulative distribution function (CDF) may be P, as previously discussed.

In various embodiments, if the collision probability (e.g., probability that IDs of two ICs may be similar) is substantially higher (e.g., higher than a threshold value), a more robust ID (e.g., an ID that may have relatively less collision probability) may be created. For example, the circuit elements selected for generating the ID may be increased, the length of the ID may be increased (e.g., by increasing the number of scaling factors to be considered for generating the ID), and/or the number of attributes to be used may be increased.

Statistical Analysis of Collision of IDs

Figure 8:
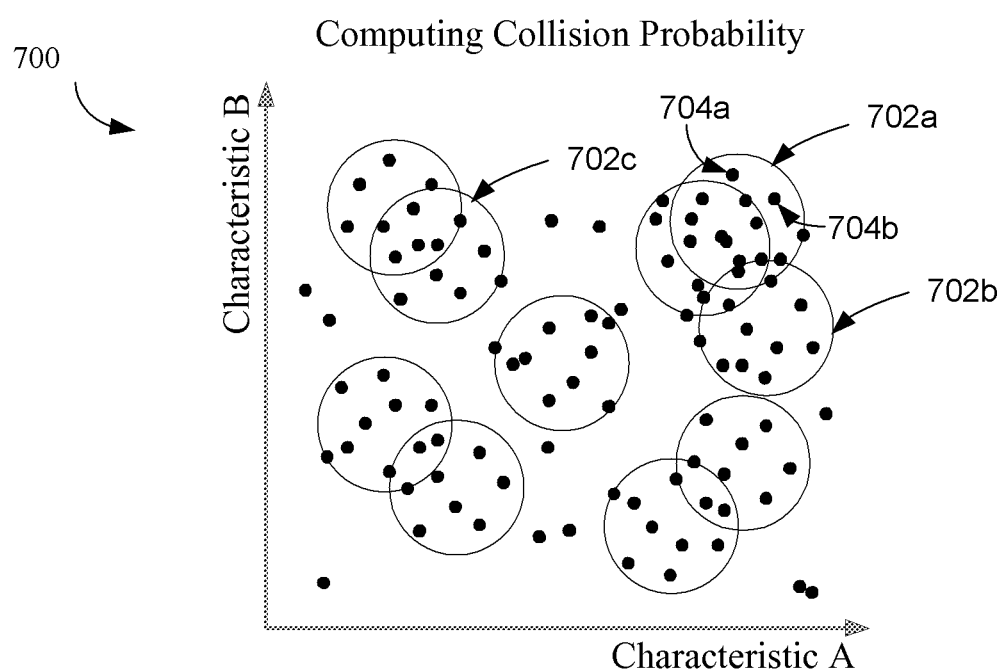
FIG. 8 illustrates an example plot illustrating collision probability of IDs of ICs.

FIG. 8 illustrates an example plot 700 illustrating collision probability of IDs of ICs, in accordance with various embodiments of the present disclosure. The plot may be generated, for example, using Monte Carlo simulations. The analog values of two scaling factors (e.g., characteristics A and characteristics B) of corresponding circuit elements are illustrated in plot 700. The extracted analog scaling factors of individual circuit elements may be used as an axis in the plot.

Although only two scaling factors are used herein to generate plot 700, more than two scaling factors may be used to generate such plots (although such plots may have higher dimensions). For example, M' number of characteristics (e.g., M' number of scaling factors) may result in a M' dimensional space.

In various embodiments, there may be K number of ICs, wherein M' number of scaling factors of individual ICs may be considered to generate an ID of the respective IC. A probability of collision of the IDs (e.g., probability that more than one IC have the same ID) may be computed. For computing the collision probability, a sphere in the M' dimensions may be positioned multiple times (e.g., 10 two-dimensional spheres 702a, . . . , 702c, etc. in FIG. 8). The center of individual spheres may represent the position of an ID. The points that fall within one circle may be assigned the same IDs (e.g., points 704a and 704b falling within one circle 702a). Since the experiment (e.g., circle generation) may be repeated multiple times, the number of possible points inside individual circle may be counted because of finite resolution of measurements.

The probability of collision for the whole space may be calculated as:

$$P(\text{collision}) = \sum_{n=1}^{N_{MC}} P(\text{collision}| C_n) P(C_n)$$

$N_{MC}$ may denote the number of Monte Carlo simulation runs, n may be the index of individual simulations, and $C_n$ may be the generated spheres for one simulation run. The parameters of the Monte Carlo analysis may be the radius of the sphere and the number of random runs ($N_{MC}$).

In various embodiments, if the collision probability (e.g., probability that IDs of two ICs may be similar) is substantially higher (e.g., higher than a threshold value), a more robust ID (e.g., an ID that may have relatively less collision probability) may be created. For example, the length of the ID may be increased (e.g., by increasing the number of scaling factors to be considered for generating the ID) and/or the number of attributes to be used may be increased.

The generated scaling factors and the ID of an IC may be used in numerous applications. For example, scaling factors of one or more attributes of a plurality of circuit elements may be generated, and the generated scaling factors may be utilized to improve an operating condition of an IC. For example, the scaling factors may indicate leakage currents of one or more circuit elements in the IC. In various embodiments, during an operation of the IC, the input vectors may be selected such that the leakage current of the IC is reduced. For example, a circuit element which may be identified (from a corresponding scaling factor) to have a higher leakage current may be used relatively less frequently (or for a less duration of time or clock periods) compared to a circuit element having a relatively lower leakage current. Such selective use of the circuit elements may be achieved, for example, by appropriately choosing the input vector.

In various embodiments, input vectors or a schedule of a data assignment may be determined such that adverse effects of one or more other attributes (e.g., switching delay, switching power, operating temperature, parasitic capacitance, offset voltage, gain) may be reduced. Reduction of one or more of these attributes may result in, for example, improved power and thermal management, improved operating condition, prolonged operating life, etc. of the IC. In various embodiments, an operational voltage for a task to be executed on the IC within a given duration of time may also be determined, such that a total leakage current, temperature, parasitic capacitance or speed of aging of the IC is reduced. Such determination may be based at least in part on the scaling factors of one or more circuit elements.

In various embodiments, an ID and/or the scaling factors of an IC may be used to authenticate the IC. For example, an ID of an IC (or scaling factors of one or more circuit elements of the IC) may be unique. In various embodiments, the IC may authenticate itself to a device (e.g., a server, a device responsible for authenticating, etc.) using the IC's unique ID (or scaling factors of one or more circuit elements of the IC). The device may challenge an identification of the IC by initiating an application of one or more input vectors to one or more of the circuit elements included in the IC. In response to the applied input vectors, the device may measure one or more response values, wherein the response values may include indication of one or more operational characteristics (e.g., leakage current, switching delay, switching power, operating temperature, parasitic capacitance, offset voltage, gain) of the circuit elements. The response values may be associated with the scaling factors of the circuit elements. The device may compare the received response values with response values stored in a database external to the IC. Based on the comparison, the device may authenticate the IC. In various embodiments, the device may grant the IC or a user of the IC access or operational rights to one or more services or devices, based at least in part on authenticating the IC.

For example, a car key may have an IC embedded in it. Each time the car key is inserted in a car (with which the car key is associated), an authentication device in the car may apply input vectors to the IC in the car key, and receive response values, where the response values may include indication of one or more operational characteristics of the one or more circuit elements of the IC. The authentication device may compare the response values with response values stored in a database accessible to the authentication device, and authenticate the IC based on a positive comparison. Once the IC is authenticated, the authentication device may, for example, allow the user of the car key to start the car.

In various embodiments, the ID and/or the scaling factors of an IC may be used in many other security and authentication applications, e.g., for getting access to blocked television channels, authorizing a credit card sale, or the like.

Computing System

Figure 9:
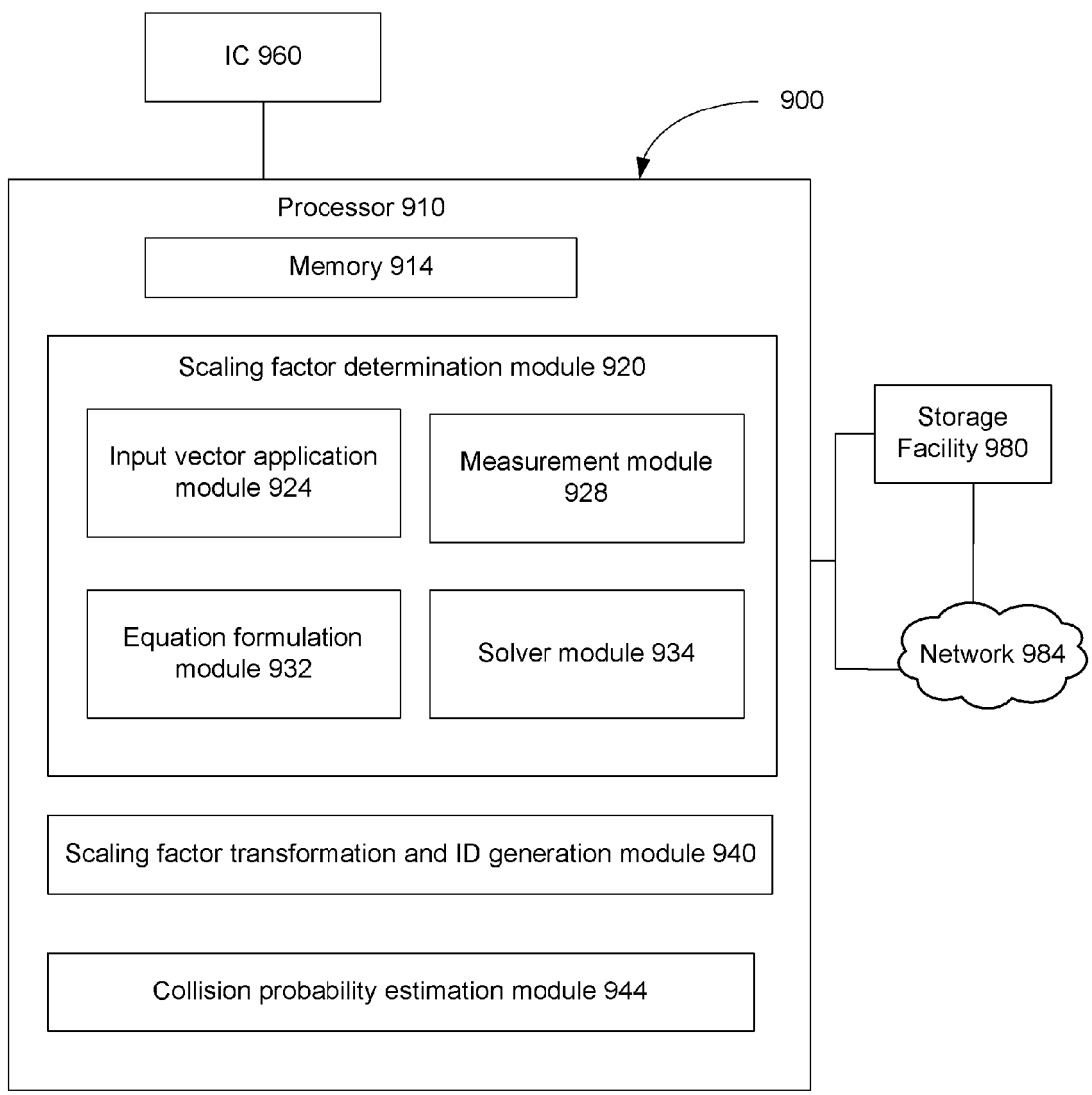
FIG. 9 illustrates an example computing system that may be suitable for practicing various embodiments.

FIG. 9 illustrates an example computing system 900 that may be suitable for practicing various embodiments of the present disclosure. Computing system 900 may comprise processor 910 and memory 914. Computing system 900 may also include one or more data models and/or computation modules configured to practice one or more methods of this disclosure. For example, the computing system 900 may include a scaling factor determination module 920 configured to determine scaling factors of an IC 960 that is operatively coupled with the computing system 900. The scaling factor determination module 920 may also include an input vector application module 924 configured to select and apply or cause to be applied a plurality of input vectors to one or more circuit elements in the IC 960. In various embodiments, the input vector application module 924 may be configured to instruct other components (in the computing system 900 and/or on IC 960) to apply the input vectors to the one or more circuit elements.

The scaling factor determination module 920 may also include a measurement module 928 that may be arranged to measure or cause measurements to be taken of one or more attributes (e.g., leakage current $I_{leak}(.)$) of the IC 960. In various embodiments, the measurement module 928 may be adapted to receive such measurements from the IC 960. The scaling factor determination module 920 may also include a equation formulation module that may be configured to form one or more equations (e.g., equations 1, . . . , M) based at least in part on the measurements of one or more attributes. The scaling factor determination module 920 may also include a solver module 934 configured to formulate and solve an optimization problem to determine one or more scaling factors of one or more corresponding circuit elements in the IC 960.

In various embodiments, the computing system 900 may include a scaling factor transformation and ID generation module 940 configured to transform the determined scaling factors into an ID of IC 960. In various embodiments, the computing system 900 may include a collision probability estimation module 944 configured to estimate a collision probability of generated ID.

Although various modules of the computing system 900 may be illustrated as being separate blocks, in various embodiments, some or all of the modules may be combined into different blocks. In various embodiments, one or more of the illustrated modules may also be included in a second computing system (separate from the computing system 900), that may be partially similar and/or partially different from the computing system 900. In various embodiments, one or more of the illustrated modules may be included in the IC 960.

The computing system 900 may also be coupled to an external storage facility 980, which may be configured for storing data. In various embodiments, the computing system 900 may be operatively coupled to a network 984, through which the computing system 900 may be operatively coupled to the storage facility 980 and/or to one or ore other computing systems (not illustrated in FIG. 9). In various embodiments, the computing system 900 may store data (e.g., one or more tables previously discussed) in the storage facility 980. Although not illustrated in FIG. 9, in various embodiments, the computing system 900 may access, over the network 984, the IC 960 and/or a testing device (not illustrated in FIG. 9) operatively coupled to the IC 960 and configured to perform one or more tests on the IC 960.

In some embodiments, processor 910 may be a general-purpose processor. In some other embodiments, processor 910 may be an Application-specific Integrated Circuit (ASIC), a field-programmable gate array (FPGA), or some other logic device having specific functions built or programmed directly into it.

Memory 914 may be a hard drive, solid-state drive, Random Access Memory (RAM), or some other appropriate type of memory. In various embodiments, a plurality of programming instructions may be stored within memory 914 or other memory and configured to program processor 910 to function in accordance with various features (e.g., methods, procedures, functions, operations and/or modules) of the present disclosure.

Although not illustrated in FIG. 9, the computing system 900 may include one or more components known to those skilled in the art. For example, the computing system 900 may include one or more appropriate drives, storage media, user input devices through which a user may enter commands and data (e.g., an electronic digitizer, a microphone, a keyboard and pointing device, commonly referred to as a mouse, trackball, touch pad, joystick, game pad, satellite dish, scanner, or the like), one or more interfaces (e.g., a parallel port, game port, a universal serial bus (USB) interface), etc. and may be coupled to one or more peripherals (e.g., a speaker, a printer, etc.). The computer system 900 may operate in a networked environment (e.g., wide area networks (WAN), local area networks (LAN), intranets, the Internet, etc.) using logical connections to one or more computers, such as a remote computer (e.g., a personal computer, a server, a router, a network PC, a peer device or other common network node, etc.) connected to a network interface.

Figure 10:
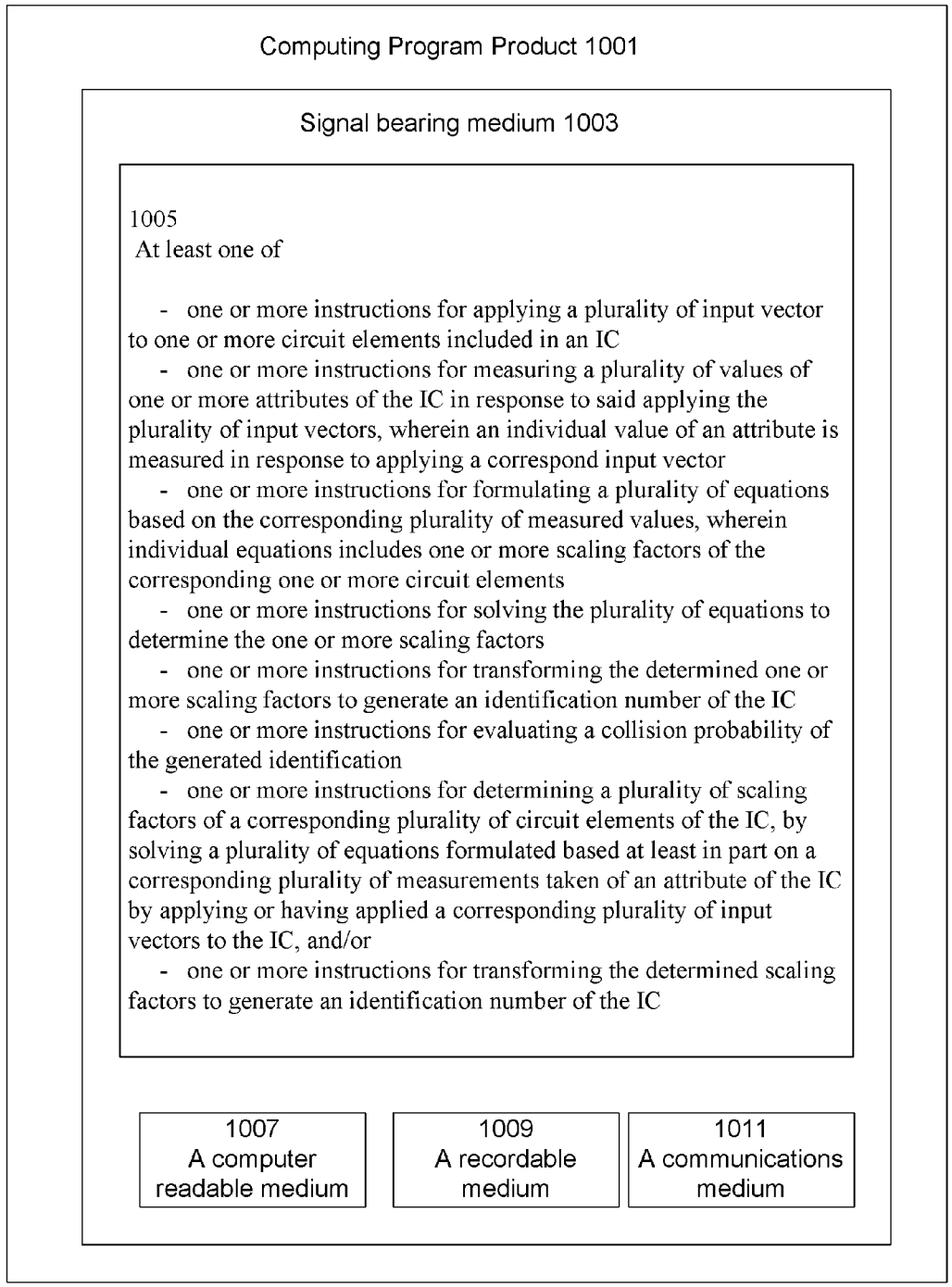
FIG. 10 illustrates an example computing program product in accordance with various embodiments; all arranged in accordance with at least some embodiments of the present disclosure.
Figures 2A, 2B, 2C, 2D:
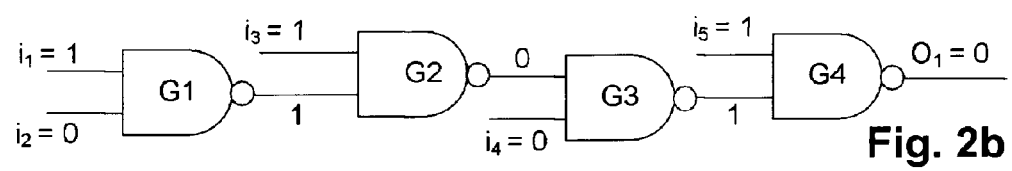

FIG. 10 illustrates an example computing program product 1001 arranged in accordance with various embodiments of the present disclosure. In various embodiments, computing program product 1001 may comprise a signal bearing medium 1003 having programming instructions stored therein. In various embodiments, the signal bearing medium 1003 may include a computer readable medium 1007, including but not limited to a CD, a DVD, a solid-state drive, a hard drive, computer disks, flash memory, or other appropriate type of computer readable medium. In various embodiments, the signal bearing medium 1003 may also include a recordable medium 1009, including but not limited to a floppy disk, a hard drive, a CD, a DVD, a digital tape, a computer memory, a flash memory, or other appropriate type of computer recordable medium. In various embodiments, the signal bearing medium 1003 may include a communications medium 1011, including but not limited to a fiber optic cable, a waveguide, a wired or wireless communications link, etc.

The computing programming product 1001 may be, for example, used for determining one or more scaling factors of one or more circuit elements included in an IC that may be coupled to the computing product 1001 and/or for generating an ID for the IC. Embodiments are not limited to any type or types of computing program products.

Signal bearing medium 1003 may contain one or more instructions 1005 configured to practice one or more aspects of the present disclosure. Embodiments may have some or all of the instructions depicted in FIG. 10. Embodiments of computing program product 1001 may have other instructions in accordance with embodiments described within this specification.

In some embodiments, the one or more instructions 1005 may include instructions for applying a plurality of input vector to one or more circuit elements included in an IC. In various embodiments, the one or more instructions 1005 may include instructions for measuring a plurality of values of one or more attributes of the IC in response to the applying the plurality of input vectors, wherein an individual value of an attribute is measured in response to applying a correspond input vector. In some embodiments, the one or more instructions 1005 may include instructions for formulating a plurality of equations based on the corresponding plurality of measured values, wherein individual equations includes one or more scaling factors of the corresponding one or more circuit elements. In various embodiments, the one or more instructions 1005 may include instructions for solving the plurality of equations to determine the one or more scaling factors. In some embodiments, the one or more instructions 1005 may include instructions for transforming the determined one or more scaling factors to generate an identification number of the IC. In various embodiments, the one or more instructions 1005 may include instructions for evaluating a collision probability of the generated identification. In some embodiments, the one or more instructions 1005 may include instructions for determining a plurality of scaling factors of a corresponding plurality of circuit elements of the IC, by solving a plurality of equations formulated based at least in part on a corresponding plurality of measurements taken of an attribute of the IC by applying or having applied a corresponding plurality of input vectors to the IC. In various embodiments, the one or more instructions 1005 may include instructions for transforming the determined scaling factors to generate an identification number of the IC.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art.

It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that individual function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/ or quantities). A typical data processing system may be implemented utilizing any suitable commercially available components, such as those typically found in data computing/ communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method for a computing device to generate an identification number of an integrated circuit (IC) including circuit elements, the method comprising:
    initiating an application of input vectors to one or more of the circuit elements included in the IC;
    receiving measurement values responsive to the application of input vectors, wherein the measurement values correspond to values measured for one or more attributes of the one or more circuit elements in response to the application of input vectors;
    formulating a plurality of equations based on the corresponding measured values, wherein each of the plurality of equations includes one or more scaling factors of the corresponding one or more circuit elements, where the scaling factors reflect a relationship between nominal values for the attributes and the measurement values for the attributes;
    solving the plurality of equations to determine the one or more scaling factors of the corresponding one or more circuit elements; and
    transforming the determined one or more scaling factors to generate the identification number of the IC.

2. The method of claim 1, wherein each of the one or more attributes include one of a leakage current, a delay, a switching power, a parasitic capacitance, an inductance, a resistance, a gain, an offset voltage, a threshold voltage, an operating temperature, a power consumption, or an idle current.

3. The method of claim 1, wherein solving the plurality of equations comprise solving equations that further include a corresponding error term based at least in part on an error in a corresponding measurement value.

4. The method of claim 3, further comprising:
    formulating an optimization problem that includes an objective function that reduces a norm of the error terms of individual equations.

5. The method of claim 3, further comprising:
    solving the optimization problem using one of linear programming, piecewise linear programming, non-linear programming, quadratic programming, or convex programming.

6. The method of claim 1, further comprising identifying one or more of the circuit elements as ambiguous circuit elements, wherein formulating the plurality of equations further comprises formulating the plurality of equations such that the one or more of the ambiguous circuit elements are excluded from individual equations of the plurality of equations.

7. The method of claim 1, further comprising:
    causing a change in an operating condition of the IC to reduce the precision required for the measurement values.

8. The method of claim 1, wherein transforming the determined one or more scaling factors further comprises:
    selecting one or more of the scaling factors;
    mapping the one or more selected scaling factors into corresponding binary codes; and
    generating the identification number of the IC using the binary codes.

9. The method of claim 8, further comprising:
    identifying one or more bits of an indicator string corresponding to one or more circuit elements whose scaling factors have been selected; and
    setting the identified one or more bits to 1, such that the indicator string indicates the circuit elements whose scaling factors have been used for generation of the identification number of the IC.

10. The method of claim 8, wherein selecting one or more of the scaling factors further comprises:
    generating a probability distribution function (PDF) of the scaling factors;
    partitioning an area under the PDF into individual segments;
    dividing the individual segments into a first set of segments and a second set of segments, such that the individual segments in the first set of segments and the individual segments in the second set of segments are interleaved; and
    selecting one or more scaling factors that are in the first set of segments.

11. The method of claim 10, wherein mapping comprises:
    assigning binary codes to the individual segments in the first set of segments such that each individual segment in the first set of segments is associated with a respective one of the binary codes; and
    assigning binary codes to the scaling factors included in the individual segments of the first set of segments based on the binary codes assigned to the individual segments.

12. The method of claim 1, wherein transforming the determined one or more scaling factors further comprises:
    generating a probability distribution function (PDF) of the scaling factors;
    partitioning an area under the PDF into individual segments, each segment having approximately equal area;
    assigning binary codes to the individual segments such that each individual segment is associated with a respective one of the binary codes;
    assigning binary codes to the scaling factors included in the individual segments based on the binary codes assigned to the individual segments; and
    generating the identification number of the IC using the binary codes assigned to the scaling factors.

13. The method of claim 1, further comprising:
authenticating the IC, in response to determining the one or more scaling factors and/or generating the identification number of the IC.

14. The method from claim 13, wherein authenticating the IC further comprises:
challenging an identification of the IC by initiating an application of one or more input vectors to one or more of the circuit elements included in the IC;
receiving response values responsive to the challenging, wherein the response values include indication of one or more operational characteristics of the one or more circuit elements;
comparing the received response values with response values stored in a database external to the IC; and
authenticating the IC based at least in part on said comparing.

15. The method from claim 13, further comprising:
granting the IC or a user of the IC access or operational rights to one or more services or devices, based at least in part on authenticating the IC.

16. The method from claim 1, further comprising:
determining a schedule of data assignment to one or more circuit elements of the IC, such that a total leakage current, temperature, parasitic capacitance or speed of aging of the IC is reduced.

17. The method from claim 1, further comprising:
determining an operational voltage of the IC for a task to be executed on the IC within a duration of time such that a total leakage current, temperature, parasitic capacitance or speed of aging of the IC is reduced, based at least in part on the determined scaling factors of one or more circuit elements.

18. An apparatus arranged to determine an identification number of an integrated circuit (IC) including circuit elements, the apparatus comprising:
a storage medium configured to store programming instructions; and
a processor coupled to the storage medium and configured by the programming instructions to cause the apparatus, when the programming instructions are executed by the processor, to:
initiate an application of input vectors to one or more of the circuit elements included in the IC;
receive measurement values responsive to the application of input vectors, wherein the measurement values correspond to values measured for one or more attributes of the one or more circuit elements in response to the application of input vectors;
formulate a plurality of equations based on the corresponding measured values, wherein each of the plurality of equations includes one or more scaling factors of the corresponding one or more circuit elements where the scaling factors reflect a relationship between nominal values for the attributes and the measurement values for the attributes;
solve the plurality of equations to determine the one or more scaling factors of the corresponding one or more circuit elements; and
transform the determined one or more scaling factors to generate the identification number of the IC.

19. The apparatus of claim 18, wherein the processor is further configured by the programming instructions to cause the apparatus to transform the determined one or more scaling factors by causing the apparatus to:
select one or more of the scaling factors;
map the one or more selected scaling factors into corresponding binary codes; and
generate the identification number of the IC using the binary codes.

* * * * *

UNITED STATES PATENT AND TRADEMARK OFFICE
CERTIFICATE OF CORRECTION

PATENT NO. : 8,417,754 B2
APPLICATION NO. : 12/463984
DATED : April 9, 2013
INVENTOR(S) : Potkonjak et al.

It is certified that error appears in the above-identified patent and that said Letters Patent is hereby corrected as shown below:

In the Drawings

Delete drawing sheet 2 of 10 and substitute the attached drawing sheet therefor.

In Fig. 4, Sheet 4 of 10, for Tag "312", in Line 2, delete "equations equations" and insert -- equations --, therefor.

In the Specifications

In Column 5, Lines 1-9, delete "leakage current..............(e.g., 4*95.7nA)." and insert the same in Column 4, Line 67, after "11, the" as a continuation of the paragraph.

In Column 8, Line 13, delete "m-1," and insert -- m=1, --, therefor.

In Column 10, Line 8, delete "(i1,...,i6) to" and insert -- $(i_1,...,i_6)$ to --, therefor.

In Column 12, Line 65, delete "520a," and insert -- 502a, --, therefor.

In Column 15, Line 2, delete "n" and insert -- $n=2^M$ --, therefor.

In Column 15, Line 34, delete "Pi" and insert -- $P_i$ --, therefor.

In Column 18, Line 48, delete "ore" and insert -- more --, therefor.

In the Claims

In Column 25, Line 5, in Claim 14, delete "from claim" and insert -- of claim --, therefor.

Signed and Sealed this
Sixth Day of August, 2013

Teresa Stanek Rea
*Acting Director of the United States Patent and Trademark Office*

In Column 25, Line 18, in Claim 15, delete "from claim" and insert -- of claim --, therefor.

In Column 25, Line 22, in Claim 16, delete "from claim" and insert -- of claim --, therefor.

In Column 25, Line 27, in Claim 17, delete "from claim" and insert -- of claim --, therefor.

| | NAND Gate | |
|---|---|---|
| Input | Nominal leakage current (nA) | |
| 10a → 00 | 37.84 | |
| 10b → 01 | 100.3 | |
| 10c → 10 | 95.7 | |
| 10d → 11 | 454.5 | |

| Gate | Scaling Factor | |
|---|---|---|
| | IC1 | IC2 |
| 50a → G1 | .5 | 2.4 |
| 50b → G2 | 1.3 | 0.6 |
| 50c → G3 | 2.1 | 4 |
| 50d → G4 | 3 | 0.9 |

| Input vector | Total Leakage (nA) | |
|---|---|---|
| | IC1 | IC2 |
| 70a → 00011 | 1391 | 2055 |
| 70b → 10101 | 2082 | 1063 |
| 70c → 01110 | 1243 | 2150 |
| 70d → 11001 | 1841 | 1905 |